United States Patent
Jacobson

(10) Patent No.: US 9,103,425 B2
(45) Date of Patent: Aug. 11, 2015

(54) COST CONFIGURABLE HYSTAT DRIVE SYSTEM

(71) Applicant: Caterpillar Inc., Peoria, IL (US)

(72) Inventor: Evan Earl Jacobson, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 64 days.

(21) Appl. No.: 14/010,160

(22) Filed: Aug. 26, 2013

(65) Prior Publication Data

US 2015/0057119 A1    Feb. 26, 2015

(51) Int. Cl.
*F16H 47/07*    (2006.01)

(52) U.S. Cl.
CPC ........................ *F16H 47/07* (2013.01)

(58) Field of Classification Search
CPC ........................................ F16H 47/07
USPC .............. 475/1, 32, 72–75, 83; 180/242, 305
See application file for complete search history.

(56) References Cited

U.S. PATENT DOCUMENTS

| | | | |
|---|---|---|---|
| 2,060,220 A | 11/1936 | Kennedy et al. | |
| 4,502,558 A | 3/1985 | Mauri | |
| 7,070,531 B2 | 7/2006 | Ishizaki | |
| 7,690,198 B2 | 4/2010 | Rousseau et al. | |
| 7,712,565 B2 | 5/2010 | Udagawa et al. | |
| 8,574,109 B2 * | 11/2013 | Heindl | 475/74 |
| 2004/0242357 A1 * | 12/2004 | Ishizaki | 475/72 |
| 2007/0187207 A1 | 8/2007 | Hofer | |
| 2008/0277182 A1 * | 11/2008 | Heindl | 180/242 |
| 2009/0145682 A1 | 6/2009 | Bohrer | |
| 2009/0314571 A1 | 12/2009 | Fausch | |
| 2010/0307843 A1 * | 12/2010 | Lawson, Jr. | 180/6.48 |
| 2012/0157253 A1 * | 6/2012 | Hoff | 475/1 |
| 2012/0270690 A1 * | 10/2012 | Haglsperger et al. | 475/5 |
| 2014/0213404 A1 * | 7/2014 | Schindler et al. | 475/74 |

FOREIGN PATENT DOCUMENTS

| | | |
|---|---|---|
| EP | 0562594 A1 | 9/1993 |
| EP | 0562594 A1 | 9/1993 |
| JP | 20020081541 | 3/2002 |

* cited by examiner

*Primary Examiner* — Edwin A Young
(74) *Attorney, Agent, or Firm* — Miller, Matthias & Hull LLP

(57) ABSTRACT

A cost configurable drive system for machines having dual/tandem axle drive systems employs a split hystat power system. The system performance can be easily adjusted by the removal or installation of a planetary gear set and a clutch box. In this way, the system is configurable with components removed or substituted to allow for a less capable but lower cost offering, while allowing for very simple upgrade to a fully capable system.

11 Claims, 6 Drawing Sheets

50

| System | Rimpull, kN | Ground Spd, kph |
|---|---|---|
| Requirement | 271 | Stall |
| | 55 | 10 |
| Full | 332 | Stall |
| | 106 | 12.3 |
| Three Quarter | 289 | Stall |
| | 93.1 | 14 |
| Half | 202.3 | Stall |
| | 92.4 | 14 |

FIG. 6

COST CONFIGURABLE HYSTAT DRIVE SYSTEM

TECHNICAL FIELD OF THE DISCLOSURE

The present disclosure relates to machine drive power generation and delivery and, more particularly, relates to an efficiently customizable hydrostatic drive system.

BACKGROUND OF THE DISCLOSURE

In industry, as in most endeavors, there is often a trade-off between cost and performance. Higher performance machinery is generally more expensive to manufacture and hence more costly for the purchaser, while lower performance machinery is generally less expensive. In this way, purchasers essentially pay for the performance they need, in what has the potential to be a very efficient model of balancing cost and performance.

However, the efficiency of this model is disrupted to some extent by the often substantial structural differences between low cost/low performance models and high cost/high performance models. In particular, manufacturers that provide different grades of machines generally must have distinct tooling and processes dedicated to each level of machine. Moreover, the efficiency gained by the purchaser may be offset in the event that an upgrade in performance is needed. Typically, such an upgrade is a complex and expensive process, and indeed, in some cases, total machine replacement may be more economical than upgrading an existing machine.

In general terms, the inventor has conceived that greater efficiency for machine production and upgrade may be achieved by componentizing the power and drive systems with high granularity. Although systems exist that provide an increased level of granularity of componentization compared to standard centralized power production systems, such higher granularity systems do not provide sufficient granularity to allow more efficient production and upgrade capabilities.

For example, U.S. Pat. Pub. No. 2009/0145682, entitled Propulsion Drive System for a Utility Vehicle, teaches a propulsion drive system having an internal combustion engine, a hydraulic pump driven by the engine, a first actuator to vary the fluid displacement of the hydraulic pump, a hydraulic motor, and a second actuator to vary the fluid displacement of the hydraulic motor. The system is said to be controlled so as to maximize the overall efficiency of the hydraulic pump and the hydraulic motor. Nonetheless, opportunities remain for a more cost effectively upgradable system.

The present disclosure is directed to a system, embodiments of which may address one or more of the shortcomings set forth above. However, it should be appreciated that the solution of any particular problem is not a limitation on the scope of this disclosure nor of the attached claims except to the extent expressly noted. Additionally, the inclusion of any problem or solution in this Background section is not an indication that the problem or solution represents known prior art except as otherwise expressly noted. While the US2009/0145682 reference is briefly discussed above, this discussion is for the reader's convenience, and is not itself prior art nor is it intended to alter, supplement, supplant or interpret the teachings of this reference.

SUMMARY OF THE DISCLOSURE

In accordance with one aspect of the present disclosure, a hydrostatically powered machine includes a front set of ground engaging elements proximal to and supporting a front portion of the machine. A rear set of ground engaging elements is proximal to and supporting a rear portion of the machine. The machine includes at least one hydraulic pump and a plurality of hydraulic motors selectively linked to the at least one hydraulic pump. The plurality of hydraulic motors include a front hydraulic motor configured to drive the front set of ground engaging elements and a rear hydraulic motor configured to drive the rear set of ground engaging elements. The front hydraulic motor and the rear hydraulic motor are selectively mechanically linkable to one another.

In accordance with another aspect of the present disclosure, a hydrostatic power system includes at least one hydraulic pump and a plurality of hydraulic motors selectively linked to the at least one hydraulic pump. The plurality of hydraulic motors include a first hydraulic motor configured to drive a first set of ground engaging elements via a first output shaft and a second hydraulic motor configured to drive a second set of ground engaging elements via a second output shaft. The first output shaft and the second output shaft are selectively mechanically linkable to one another.

In accordance with yet another aspect of the present disclosure, a split hydrostatic drive system includes a first set of ground engaging elements and a second set of ground engaging elements, each set of ground engaging elements including a plurality of ground engaging elements. The system further includes a first output shaft linked to the first set of ground engaging elements and a second output shaft linked to the second set of ground engaging elements, the first output shaft and second output shaft being selectively linkable via a clutch. A first hydraulic motor is configured to drive the first output shaft via a planetary gear set and a second hydraulic motor is configured to drive the second output shaft via a pinion and spur gear set. At least one hydraulic pump is configured to supply hydraulic fluid to the first hydraulic motor and the second hydraulic motor.

Other features and advantages of the disclosed systems and principles will become apparent from reading the following detailed disclosure in conjunction with the included drawing figures.

BRIEF DESCRIPTION OF THE DRAWINGS

FIG. 6 is a chart showing calculated rim pull values at specified speeds that may be achieved assuming pump and motor displacements

DETAILED DESCRIPTION OF THE DISCLOSURE

Embodiments of the present disclosure address the need, determined by the inventor, for a cost configurable drive system to allow configuring the cost and capabilities of the drive system without requiring significantly different solutions for each performance and price level. In particular, the traditional use of different transmission technologies for each market served incurs significant capital as well as research and development investment. This state of affairs also increases inventory requirements and generally leads to complex parts and inventory logistical requirements.

In addition to reducing the complexity of the system and associated logistics as noted above, the described embodiments also provide ease of use with respect to system smoothness and full power sharing authority. The manufacturing cost is reduced by eliminating the need to maintain different lines and associated tools and personnel, the distributor cost is reduced by eliminating the need to stock many distinct parts and machine lines, and the purchaser cost is lowered by the ability to fit the system level to the application and to easily scale up later if needed.

In an embodiment provided for a medium wheel loader ("MWL") machine, the transmission, drop box and inter-axle differential associated with a traditional MWL design are not used and a split hydrostatic ("hystat") system is employed instead. A planetary gear set and clutch box are mounted to each axle, with drive shafts running between the axle units. As will be appreciated from the more detailed description below, the design of the system thus provides ease of configuration and reconfiguration, with components removed or substituted to allow for a less capable but lower cost offering, while allowing for very simple upgrade to a fully capable system when needed.

Figure 1:
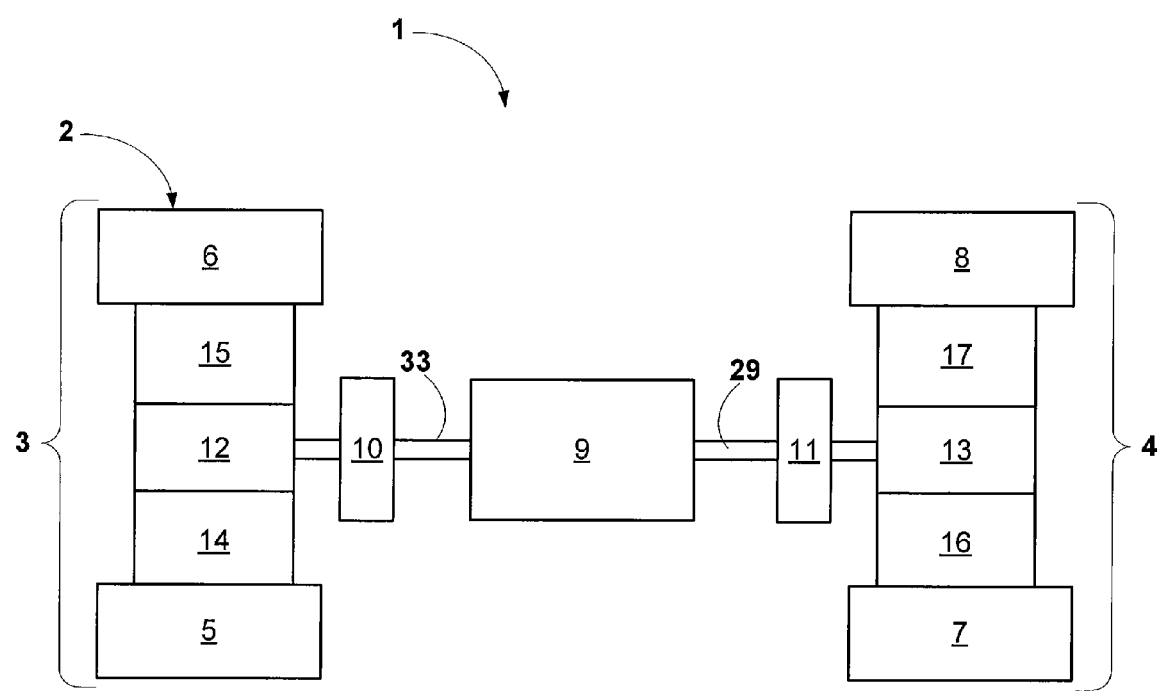
FIG. 1 is a schematic diagram of a transmission system and associated systems in keeping with an embodiment of the described principles.

Having discussed various embodiments in overview, we turn now to detailed descriptions of certain illustrative embodiments. FIG. 1 is a high-level system schematic showing a drive system and associated structures and components in keeping with an embodiment of the disclosed principles. In the illustrated example, a machine 1, such as a MWL or other machine, includes a plurality of ground engaging elements 2 such as tires or tracks.

The ground engaging elements 2 include a front set 3 of ground engaging elements 2 and a rear set 4 of ground engaging elements 2. In the illustrated embodiment, each set 3,4 includes a left ground engaging element and a right ground engaging element, such that the front set 3 includes left front element 5 and a right front element 6, and the rear set 4 includes a left rear element 7 and a right rear element 8. Within each set 3, 4 of ground engaging elements, power is received and distributed via a respective ring and pinion group (including first ring and pinion group 12 and second ring and pinion group 13). Each ring and pinion group 12, 13 drives final drive units on the respective ground engaging elements. Thus, the front ring and pinion group 12 drives a left front final drive unit 14 to propel the left front element 5, and drives a right front final drive unit 15 to propel the right front element 6. Similarly, the rear ring and pinion group 13 drives a left rear final drive unit 16 to propel the left rear element 7, and drives a right rear final drive unit 17 to propel the right rear element 8.

The illustrated machine 1 also includes a power system 9, shown as being centrally located within the machine 1. The power system 9 is linkable to the front set 3 of ground engaging elements 2 via a first clutch 10. Similarly, the power system 9 is linkable to the rear set 4 of ground engaging elements 2 via a second clutch 11. In an embodiment, the power system 9 comprises a hystat power system as will be more fully appreciated from the following detailed discussion thereof.

Figure 2:
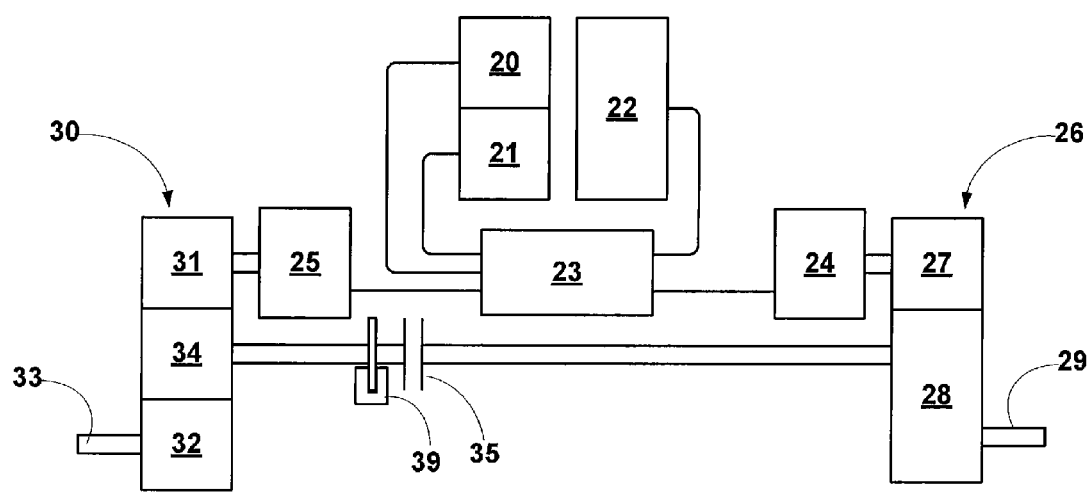
FIG. 2 is a schematic diagram of a power system showing an exemplary architecture for the power system of FIG. 1.

In keeping with this embodiment, FIG. 2 is a schematic power system diagram showing an exemplary architecture for the power system 9. In this embodiment, the power system 9 includes a primary pump/motor 20 and a secondary pump/motor 21. The pump/motors 20, 21 may be variable displacement hydraulic pumps/motors, e.g., having a displacement controlled by actuation of a swash plate. In one aspect, the primary pump/motor 20 has a larger overall displacement, e.g., 175 cc, than that of the secondary motor 21, e.g., 100 cc.

The power system 9 further includes a hydraulic accumulator 22. As will be appreciated by those of skill in the art, the hydraulic accumulator 22 is a pressure storage reservoir configured to hold hydraulic fluid under pressure. The pressurizing medium may be any suitable medium including, for example, a compressed inert gas. The hydraulic accumulator 22 provides additional hydraulic power to the power system 9 during transient demands that exceed the pump capabilities, and may also act to absorb pressure spikes and pulses in the system.

For converting hydraulic power to rotary power, the power system 9 includes a primary motor/pump 24 and a secondary motor/pump 25. As with the pumps/motors 20, 21, the primary motor/pump 24 and secondary motor/pump 25 may be variable displacement hydraulic motors/pumps, e.g., having a displacement controlled by actuation of a swash plate. In one aspect, the primary motor/pump 24 has a larger overall displacement, e.g., 250 cc, than that of the secondary motor/pump 25, e.g., 107 cc.

A valve block 23 is linked to the primary pump/motor 20, secondary pump/motor 21, hydraulic accumulator 22, primary motor/pump 24 and secondary motor/pump 25. The valve block 23 controls the distribution of hydraulic fluid from the primary pump/motor 20 and secondary pump/motor 21 to the hydraulic accumulator 22 and from the primary pump/motor 20, secondary pump/motor 21 and hydraulic accumulator 22 to the primary motor/pump 24 and secondary motor/pump 25. The displacements of both pumps/motors and both motor/pumps are controlled to manage the power consumption and power output of the power system 9.

The primary motor/pump 24 provides rotary power to a primary output gear set 26, comprising a pinion gear 27 and a spur gear 28. The output of the spur gear 28 is the rear output 29 of the power system 9. The secondary motor/pump 25 provides rotary power to a secondary output gear set 30, which is a planetary gear set. The secondary motor/pump 25 drives a ring gear 31 of the secondary output gear set 30, while a sun gear 32 of the secondary output gear set 30 provides the front output 33 of the power system 9.

A carrier 34 of the secondary output gear set 30 is selectively linked to the spur gear 28 of the primary output gear set 26 via a clutch box 35. In this way, the primary motor/pump 24 and the secondary motor/pump 25 may operate separately or in a torque summing mode depending on the state of the clutch box 35. In particular, based upon active/inactive clutches, the secondary output gear set 30 enables a higher speed for the full (two-range) system while allowing the two motors to work together in low range to sum their torque to meet stall demand. A brake 39 is provided to lock the carrier 34 when the clutch box 35 is not engaged.

When clutch box 35 is engaged (transmitting power) and brake 39 is open, the primary motor/pump 24 defines the carrier 34 speed/torque. The secondary motor/pump 25 defines the ring 31 speed/torque, so the resultant sun 32 speed/torque is defined. When the clutch box 35 is disengaged, there is no control of the carrier 34, so brake 39 is preferably closed to lock the carrier 34.

For traction control purposes, it may be desirable to control the axles independently. For example, if conditions are slick, and the machine is digging, all down force may be on the front set 3 of ground engaging elements 2 as the rear set 4 of ground engaging elements 2 lifts from ground contact. However, the tractive coefficient may be too low to absorb more than the torque generated from just the secondary motor/pump 25. In this case, only the front set 3 of ground engaging elements 2 is required, and power to the rear system can be disabled for efficiency.

Figure 3:
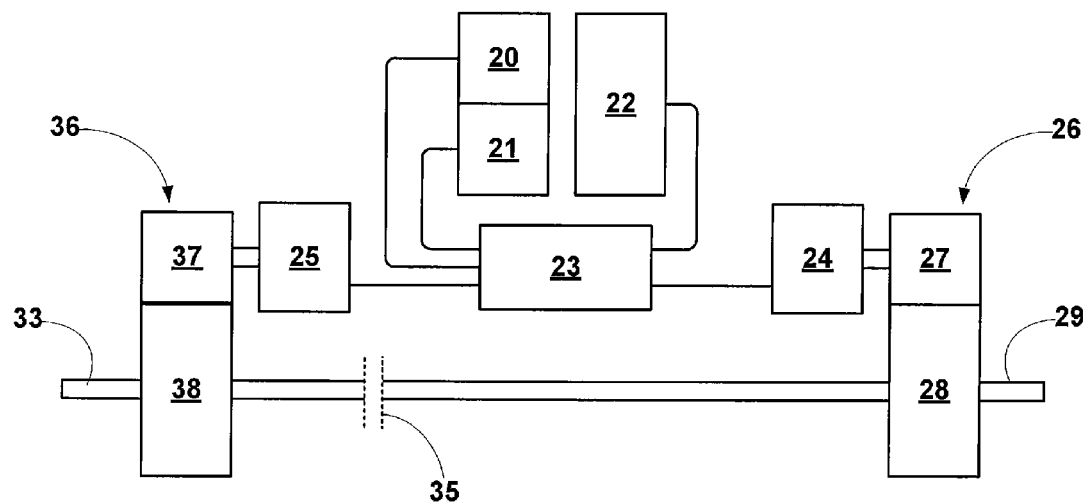
FIG. 3 is a schematic diagram of a power system showing an exemplary architecture of a three-quarter power system for the power system of FIG. 1.

The system may be provided in a full system, a three-quarter system, and a half system. For somewhat lower cost than the full system, described above, the three-quarter system provides a summed motor capability with a slightly lower range of configuration options than the full system. In the three-quarter system, the secondary output gear set 30 is replaced with an alternative secondary output gear set 36 (with pinion 37 and spur 38) similar to the primary output gear set 26 as shown in FIG. 3, and both motors are mounted on the same ratio set (same axle). This system may still employ the clutch box 35 for traction control if the motors are placed on separate axles, but need not contain the clutch box 35 if the motors are placed back to back on the same axle.

Figure 4:
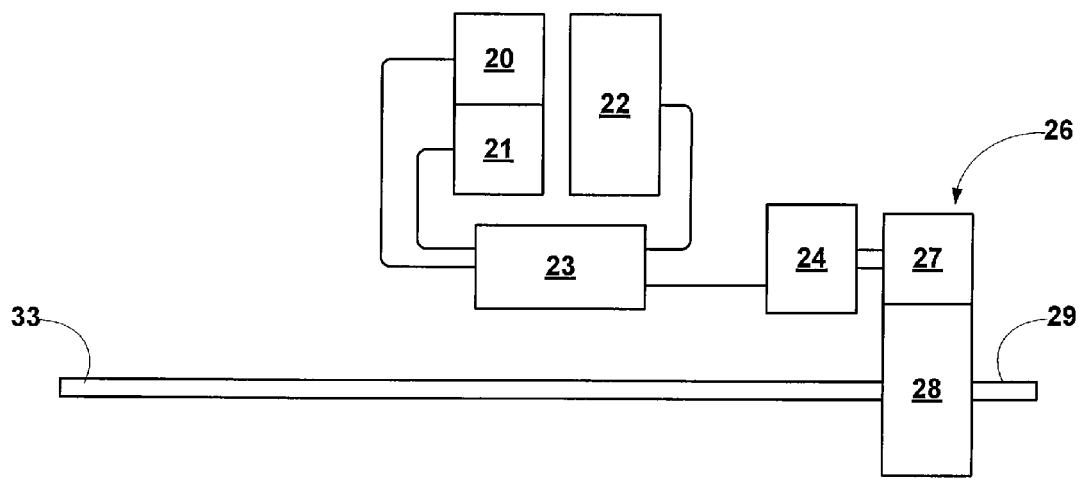
FIG. 4 is a schematic diagram of a power system showing an exemplary architecture of a half power system for the power system of FIG. 1.
Figure 5:
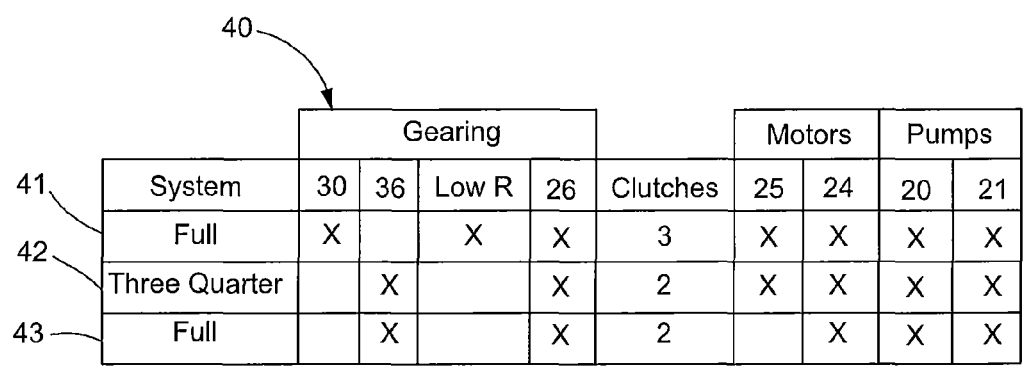
FIG. 5 is a chart showing options between full, three-quarter, and half power system options.

For an even lower cost than the full system described above, a half system eliminates one motor from the three-quarter system as shown in FIG. 4. For operation, the half system shown in FIG. 4 only requires two clutches (first clutch 10 and second clutch 11).

For smooth shifting, substantially simultaneous swash plate and clutch control actuations within the power system 9 are beneficial, with the understanding that some clutch or displacement actuations may slightly precede others to optimize the transition quality. While the example presented herein is illustrated in the context of a medium wheel loader, it will be appreciated that the described system may be applied to any other dual/tandem axle drive systems such as may be used in a motor grader or other machine.

In short, the disclosed system provides manufacturers and purchasers with options between the full, three-quarter, and half power system options, and it can be appreciated that changing from one level to another is very simple given the disclosed architecture. With respect to the full version of the power system, described in a first line 41 of the chart 40, it can be seen that the system includes the planetary secondary output gear set 30 and the low ratio provided by the secondary output gear set 30, the primary output gear set 26, primary motor/pump 24, secondary motor/pump 25, primary pump/motor 20, a secondary pump/motor 21, and 3 clutches.

With respect to the three-quarter version described in a second line 42 of the chart 40, the system differs from the full system by omitting the planetary secondary output gear set 30 and substituting the alternative secondary output gear set 36. In addition, one clutch of the full system is eliminated.

With respect to the half version of the power system, described in a third line 43 of the chart 40, the system differs from the three quarter version of the system by omitting the secondary motor/pump 25.

INDUSTRIAL APPLICABILITY

In general terms, the present disclosure sets forth a cost-configurable power system usable in a MWL or other dual/tandem axle drive systems. Compared to a conventional drive system, the transmission, drop box and inter-axle differential are eliminated and a split hystat system is employed instead. In an example embodiment, a planetary gear set and clutch box are mounted to each axle, with drive shafts running between the axle units. The design of the described system provides ease of configuration and reconfiguration, with components removed or substituted to allow for a less capable but lower cost offering, while allowing for very simple upgrade to a fully capable system when needed.

While the relative and absolute performance of the various system versions will vary depending upon the gear sets, motors and pumps selected, FIG. 6 provides a second chart 50 showing calculated rim pull values at specified speeds that may be achieved assuming pump and motor displacements as noted above and assuming that the planetary secondary output gear set 30 has a ratio of 12:1 and an e value of 2.2, while the primary output gear set 26 has a ratio of 8:1. For the sake of illustration, the example assumes an engine output of 220 kW, and a required rim pull value of 271 KN at stall speed and 55 kN at 10 kph.

As can be seen, the full version of the power system 9 meets these requirements, providing a rim pull of 332 kN at stall speed and 106 kN at 12.3 kph. However, the full version is not required, since the three-quarter version also meets the requirements in this case. In particular, the three quarter version in this case provides a rim pull of 289 kN at stall speed and 93.1 kN at 14 kph.

However, the half version of the system would not meet the specified requirements in this case. In particular, the half version of the system provides a rim pull of 202.3 kN at stall speed and 92.4 kN at 14 kph. Thus, the purchaser may decide to purchase the system that easily meets but does not substantially exceed their requirements, i.e., the three-quarter system. If the purchaser later decides to upgrade from the three-quarter system to the full system, this can be easily accomplished as outlined above by the addition and appropriate linking of a planetary gear set, e.g., the secondary output gear set 30.

It will be appreciated that the present disclosure provides a new and useful power system architecture that provides different level of machine cost and performance through the simple addition or omission of components, without requiring significant structural changes to the machine. While only certain embodiments have been set forth, alternatives and modifications will be apparent from the above description to those skilled in the art. These and other alternatives are considered equivalents and within the spirit and scope of this disclosure and the appended claims.

What is claimed is:

1. A hydrostatically powered machine comprising:
   a front set of ground engaging elements proximal to and supporting a front portion of the machine;
   a rear set of ground engaging elements proximal to and supporting a rear portion of the machine;
   at least one hydraulic pump; and
   a plurality of hydraulic motors selectively linked to the at least one hydraulic pump, the plurality of hydraulic motors including a front hydraulic motor configured to drive the front set of ground engaging elements and a rear hydraulic motor configured to drive the rear set of ground engaging elements, wherein the front hydraulic motor and the rear hydraulic motor are selectively mechanically linkable to one another, the front hydraulic motor configured to drive the front set of ground engaging elements via a planetary gear set, the planetary gear set including a ring gear, a sun gear, and a carrier, the front hydraulic motor configured to drive the ring gear, the sun gear configured to drive the front set of ground engaging elements, the rear hydraulic motor configured to drive a pinion linked to a spur gear for driving the rear set of ground engaging elements, the carrier selectively linkable to the spur gear via a clutch.

2. The hydrostatically powered machine in accordance with claim 1, wherein the machine is a wheel loader.

3. The hydrostatically powered machine in accordance with claim 1, wherein the front hydraulic motor and the rear hydraulic motor comprise variable displacement motors.

4. The hydrostatically powered machine in accordance with claim 1, wherein each of the at least one hydraulic pumps comprises a variable displacement pump.

5. The hydrostatically powered machine in accordance with claim 1, wherein at least one of the front set of ground engaging elements and the rear set of ground engaging elements comprises one or more tires.

6. The hydrostatically powered machine in accordance with claim 1, wherein at least one of the front set of ground engaging elements and the rear set of ground engaging elements comprises one or more tracks.

7. A hydrostatic power system comprising:
   at least one hydraulic pump; and
   a plurality of hydraulic motors selectively linked to the at least one hydraulic pump, the plurality of hydraulic motors including a first hydraulic motor configured to drive a first set of ground engaging elements via a first output shaft and a second hydraulic motor configured to drive a second set of ground engaging elements via a second output shaft, wherein the first output shaft and the second output shaft are selectively mechanically linkable to one another, the first hydraulic motor configured to drive the first output shaft via a planetary gear set, the planetary gear set including a ring gear, a sun gear, and a carrier, the first hydraulic motor configured to drive the ring gear, the sun gear configured to drive the first output shaft, the second hydraulic motor configured to drive a pinion linked to a spur gear for driving the second output shaft, the carrier selectively linkable to the spur gear via a clutch.

8. The hydrostatic power system in accordance with claim 7, wherein the first and second hydraulic motors are variable displacement motors.

9. The hydrostatic power system in accordance with claim 7, wherein the at least one hydraulic pump is a variable displacement pump.

10. A split hydrostatic drive system comprising:
    a first set of ground engaging elements and a second set of ground engaging elements, each set of ground engaging elements including a plurality of ground engaging elements;
    a first output shaft linked to the first set of ground engaging elements and a second output shaft linked to the second set of ground engaging elements, the first output shaft and second output shaft being selectively linkable via a clutch;
    a first hydraulic motor configured to drive the first output shaft via a planetary gear set, the planetary gear set including a ring gear, a sun gear, and a carrier, the first hydraulic motor configured to drive the ring gear, the sun gear configured to drive the first output shaft;
    a second hydraulic motor configured to drive the second output shaft via a pinion and spur gear set, the pinion and spur gear set selectively linkable to the carrier via the clutch; and
    at least one hydraulic pump configured to supply hydraulic fluid to the first hydraulic motor and the second hydraulic motor.

11. The split hydrostatic drive system in accordance with claim 10, wherein the first and second hydraulic motors are variable displacement motors and the at least one hydraulic pump is a variable displacement pump.

* * * * *